May 16, 1939. S. E. ROSENBERG 2,158,254
WINDSHIELD WIPER
Filed Nov. 2, 1936
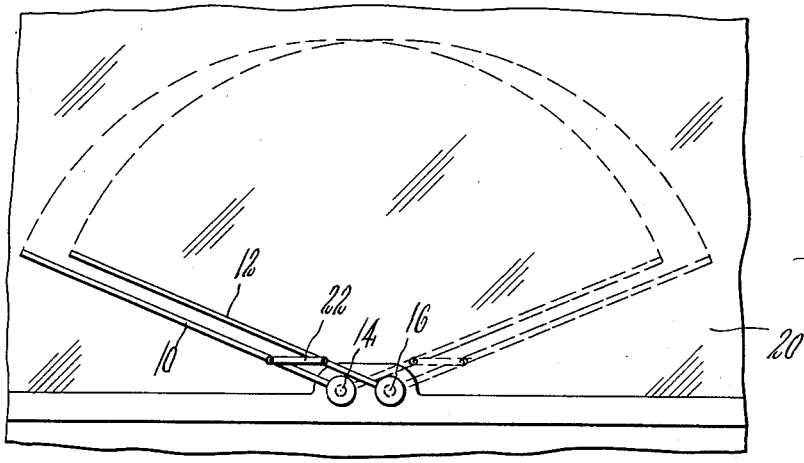
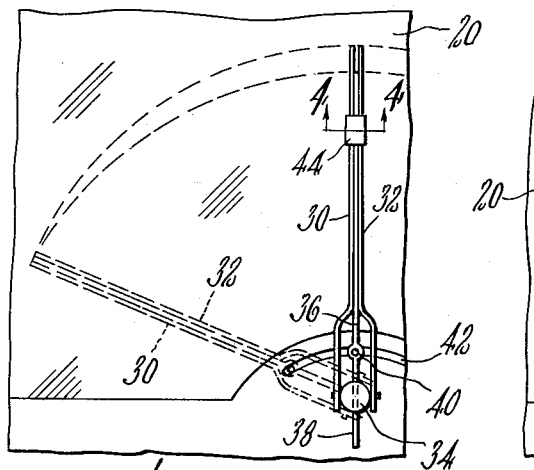
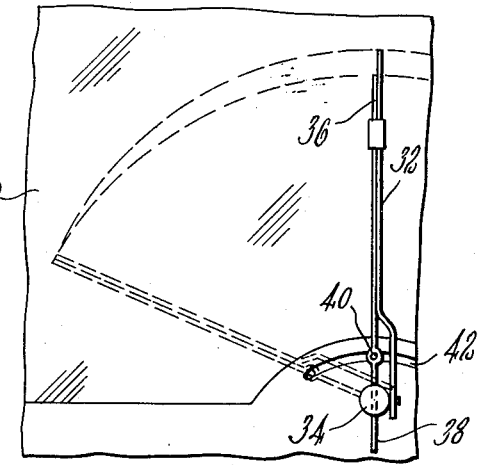
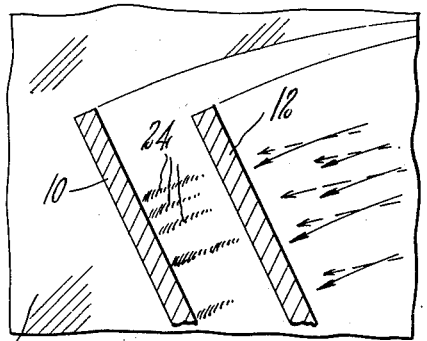
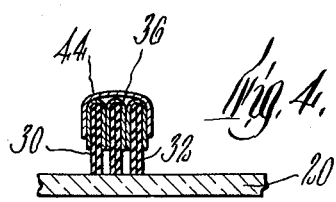
Inventor
Stig E. Rosenberg
by Wright, Brown, Quinby & May
attys.

Patented May 16, 1939

2,158,254

UNITED STATES PATENT OFFICE 2,158,254

WINDSHIELD WIPER

Stig E. Rosenberg, Brockton, Mass.

Application November 2, 1936, Serial No. 108,765

2 Claims. (Cl. 15—255)

This invention relates to a windshield wiper such as employed for wiping rain drops, etc., from an area of the surface of a windshield.

The ordinary windshield wiper comprises a wiping element consisting of a strip of soft material such as rubber which is moved back and forth over a limited area of windshield surface. According to common experience, dust and grit are liable to accumulate on the outer surface of a windshield even though the surface is frequently cleaned to give better vision. The operation of the windshield wiper often causes the wiping element to rub on particles of grit adhering to the windshield. This wears small notches or nicks in the wiping edge of the element so that eventually small streaks of moisture are left on the windshield by the wiping element. These streaks interfere with perfect vision through the windshield and are therefore objectionable.

According to the present invention, I obviate streaks of this kind by providing two or more wiping elements which are mounted so as to move across approximately the same area of the windshield surface but which move in different or intersecting paths so that the streaks of moisture which may be left by the advance wiping element will be wiped off by the second wiping element which closely follows the first but which moves along a different path. The provision of means for causing the several wiping elements to move along different intersecting paths avoids the possibility of the two wiping elements being similarly worn by contact with the same particles of grit. It is obvious that, if two wiping elements follow each other along an identical path, the grit particles which wear notches in one element will wear corresponding notches in the other element so that both elements eventually leave the same streaks of moisture on the windshield. By causing the two or more wiping elements to move along different paths, there is no duplication of wear on the wiping elements, and the second element following the first element removes any streaks which may be left by the first element.

For a more complete understanding of the invention, reference may be had to a disclosure thereof in the description of various embodiments which follows and on the drawing of which Figure 1 is an elevation of a windshield wiper embodying the invention.

Figure 2 is an elevation of a modified form of wiper embodying the invention.

Figure 3 is an elevation of a further modified form of the invention.

Figure 4 is a section on the line 4—4 of Figure 2.

Figure 5 is an enlarged fragmentary view of portions of two wiping elements, including their relative paths.

As shown in Figure 1, the invention may be embodied in a windshield wiper including a pair of elongated wiping elements 10 and 12. Individually, the wiping elements may be of any desired or convenient structure, as, for example, strips of soft rubber held in edgewise contact with the surface of the windshield. These elements are pivoted at one end at pivot points 14 and 16 respectively, so that the elements swing in circular arcs across a portion of the windshield 20. The pivot points 14 and 16 are preferably close together as indicated. Thus the areas covered by the movement of the elements 10 and 12 are approximately but not exactly the same. The boundaries of the areas swept respectively by the elements 10 and 12 are indicated by broken lines in Figure 1. These areas, as can readily be seen by an inspection of Figure 1, are nearly but not exactly the same. The elements 10 and 12 are preferably connected together by suitable means such as a short link 22. This link prevents interference or clashing of the elements one with the other, and results in simultaneous movement of the two elements across the area swept thereby. Since the wiping elements 10 and 12 are arranged to swing about different pivotal points, their arcs of swing are not identical but intersect one another. Figure 5, for example, indicates the different directions of movement of the two elements at one stage of their movement. If the wiping elements develop small notches through wear so that the element 10 is liable to leave streaks 24 of moisture, such as are indicated in Figure 5, the element 12, moving in a different direction from the path of the element 10, wipes across the streaks 24 and thus effectually removes them from the surface of the windshield. This results in a superior and effective wiping of the swept area of the windshield. Since the blades are connected together by the link 22, it is evident that only one of the elements 10 and 12 need be directly driven, the driven element serving to drive the other through the connecting link 22. Hence, it is necessary only to provide conventional means for rocking the pivot shaft 14 or 16, and such means, being in common use at the present time, are not shown in detail on the drawing.

The invention may also be embodied in other ways, such, for example, as that illustrated in Figure 2. As therein shown, a pair of wiping blades 30 and 32 are mounted on a rock shaft 34 so as to sweep an arcuate area on the windshield. The blades 30 and 32 are spaced apart sufficiently to receive a third blade 36, this blade being longitudinally slidable as well as being movable about the axis of the pivot 34 with the blades 30 and 32. As shown, the blade 36 may have an extension 38 projecting through the pivot shaft 34 and longitudinally slidable therein. The blade 36 may also be provided with a cam follower 40 riding in an arcuate cam 42 adjacent to the pivot shaft 34. The cam slot 42 is not concentric with the axis of the pivot shaft 34. As illustrated in Figure 2, it is shown in an arcuate shape, the arc having a relatively large radius of curvature. The cam slot 42 may have other shapes, provided the slot is not in the form of an arc concentric with the axis of the pivot shaft 34. As the cam follower 40 moves along the cam slot 42 when the windshield wiper is in operation, the engagement of the cam follower in the slot causes longitudinal movement of the blade 36 as it swings with the wiper blades 30 and 32. Hence the resultant path of the blade 36 differs from the path of the blades 30 and 32, and the effect will be that the blade 36 will wipe out any moisture streaks which may be left by the blade 30 or the blade 32. In order to hold the blades 30 and 32 together properly and to confine the movement of the blade 36, a cap or bridge 44 may be secured to the blades 30 and 32 so as to hold the outer portions of these blades in fixed spaced relationship to each other. The element 44 spans the wiper blade 36 and serves to hold the outer portion of this blade against the surface of the windshield.

A further modification of the invention is illustrated in Figure 3, this form of the invention being similar to that shown in Figure 2 except that one of the wiper blades is eliminated. In other respects, the structures may be substantially identical, the blade 36 being mounted to operate as hereinbefore described so that it moves along a path which differs from that of the blade 32.

It is evident that the underlying idea and purpose of the invention may be embodied in a considerable variety of specific structures so contrived as to cause a plurality of blades to sweep approximately the same area of surface of a windshield but to move along different paths so that the path of the following wiper constantly crosses the path of the leading wiper. Hence I do not limit myself to any particular form of embodiment of the invention, it being understood that the invention is to be interpreted as broadly as is consistent with the scope of the following claims.

I claim:

1. A windshield wiper comprising a pair of wiping elements separately pivoted at spaced pivot points to swing across a portion of the surface of one face of a windshield, said pivot points being close to each other, and means connecting said elements for simultaneous movement along different paths but over approximately the same area of the surface.

2. A windshield wiper comprising a pair of wiping elements separately pivoted at closely adjacent points so as to swing in intersecting circular areas which are approximately coextensive, and a short link connecting said elements for simultaneous movement.

STIG E. ROSENBERG.